United States Patent [19]

Maeyama et al.

[11] 4,241,363
[45] Dec. 23, 1980

[54] COMB FILTER CIRCUIT

[75] Inventors: Teruaki Maeyama; Hideo Nakata, both of Suita, Japan

[73] Assignee: U.S. Philips Corporation, New York, N.Y.

[21] Appl. No.: 27,957

[22] Filed: Apr. 9, 1979

[30] Foreign Application Priority Data

Apr. 13, 1978 [NL] Netherlands ............................ 7803910

[51] Int. Cl.³ ............................................ H04N 9/535
[52] U.S. Cl. .......................................... 358/36; 358/31
[58] Field of Search ...................................... 358/36, 31

[56] References Cited
U.S. PATENT DOCUMENTS 4,167,021  9/1979  Holmes ..................................... 358/31

Primary Examiner—Richard Murray
Attorney, Agent, or Firm—Thomas A. Briody; William J. Streeter; Edward W. Goodman

[57] ABSTRACT

By multiplying a combed high-frequency portion of a luminance signal by a combed chrominance signal of a color television signal, a signal is obtained which can be used for operating a suppression circuit by means of which the high frequency portion of the luminance signal, obtained from a comb filter circuit suppressing the chrominance signal, can be suppressed at the occurrence of unwanted chrominance signals in the luminance signal.

4 Claims, 6 Drawing Figures

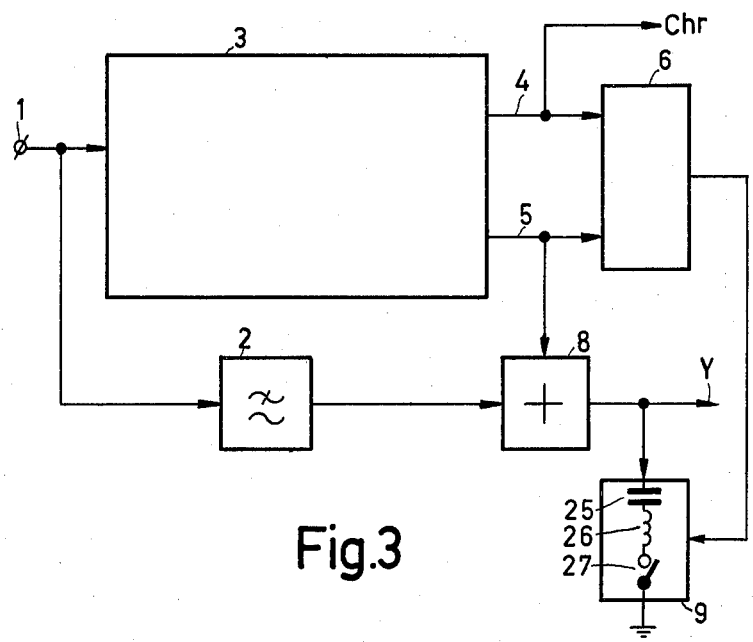
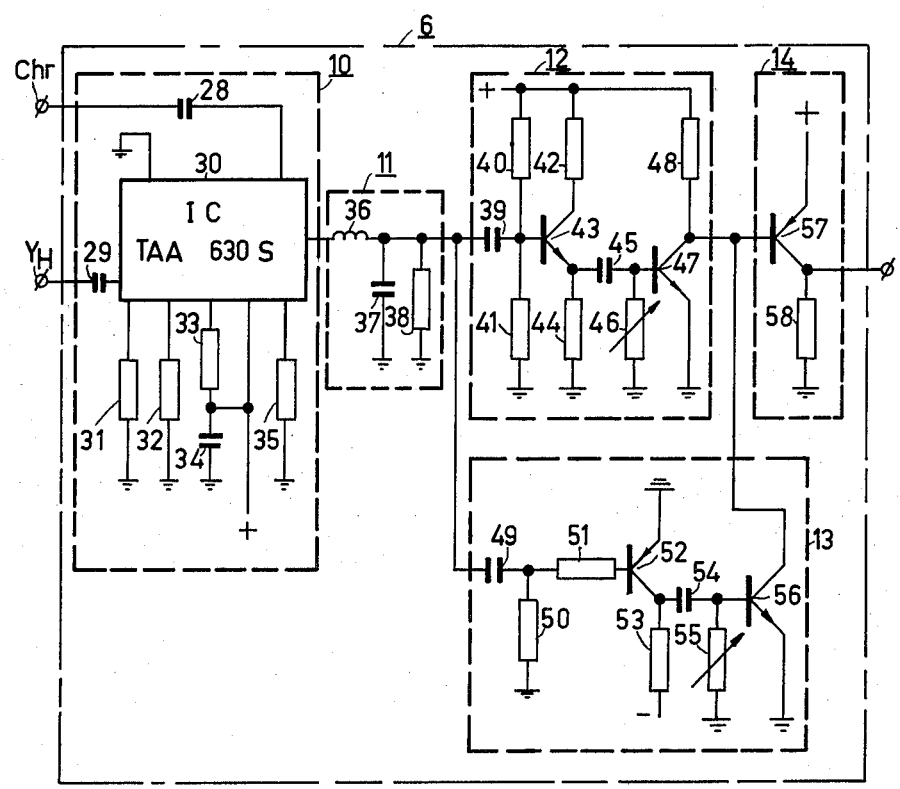
Fig.3
Fig.4

COMB FILTER CIRCUIT

BACKGROUND OF THE INVENTION

The invention relates to a comb filter circuit comprising a comb filter for obtaining at a first output thereof a combed high-frequency luminance signal component from a composite color television signal and at a second output thereof a combed chrominance signal component, a low-pass filter for obtaining at an output thereof a low-frequency luminance signal component from the composite color television signal, an adder circuit a first input of which is coupled to the first output of the comb filter and a second input to the output of the low-pass filter, and a detector for detecting an uncancelled chrominance signal component in the high-frequency luminance signal component, an output of the detector being coupled to a control signal input of an attenuation circuit for attenuating at least part of the high-frequency luminance signal component occurring at an output of the adder circuit at the occurrence of an uncancelled chrominance signal in said high-frequency luminance signal component.

A comb filter as described above is known from Journal of the SMPTE, January 1977, pages 1-5.

In that known circuit the detection of a spurious chrominance signal, occurring in the high frequency portion of the luminance signal during vertical transitions when the correlation between the signals in successive lines has been lost, is effected by amplifying, by means of a differential amplifier, any difference between an undelayed video signal and a video signal delayed for two line periods (2H).

The use of such a detection of the vertical transition by means of said differential amplifier is limited to the use of a configuration of the comb filter having a two-line period (2H) delay line as described in the above-mentioned SMPTE publication and is therefore not universal.

SUMMARY OF THE INVENTION

It is an object of the invention to provide an uncancelled chrominance signal detector suitable for universal use in any type of comb filter circuit. A comb filter circuit according to the invention, defined in the preamble, is therefore characterized in that the detector comprises a multiplier, a first input of which is coupled to the first output of the comb filter and a second input to the second output of the comb filter, an output of said multiplier being coupled to the output of the detector.

In accordance with the invention an undesired chrominance signal superimposed on the luminance signal, which results in "dot" interference during the occurrence of decorrelation in the color information of a line period and the next line period can be easily removed in any type of comb filter circuit which separates a high frequency luminance signal component and a chrominance signal component by providing a multiplier in the detection circuit.

DESCRIPTION OF THE DRAWINGS

The invention will now be further explained with reference to the drawings in which:

FIG. 3 shows the diagram of an other embodiment of a comb filter according to the invention, FIG. 4 is a diagram of a possible embodiment of a detector with its associated circuit for a comb filter circuit according to the invention.

DESCRIPTION OF THE PREFERRED EMBODIMENTS

Figure 1:
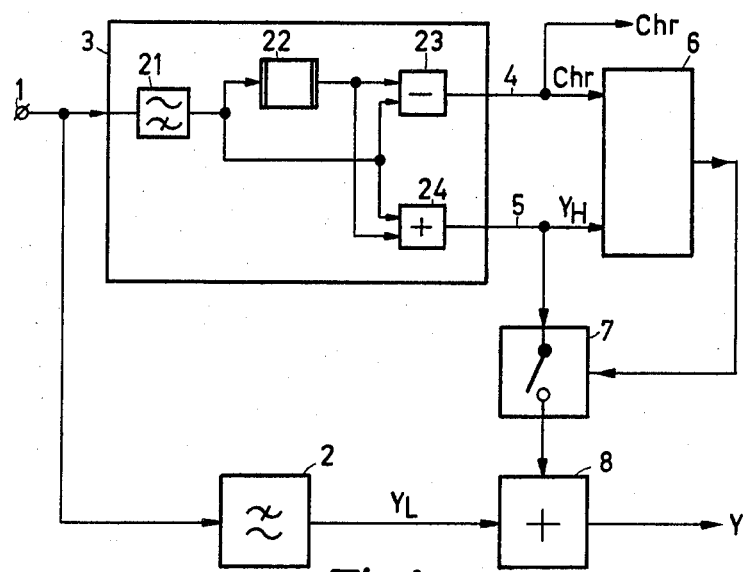
FIG. 1 shows schematically an embodiment of a comb filter according to the invention.

In FIG. 1 a composite color television signal of the N.T.S.C. type is applied to a comb filter 3. A combed high-frequency luminance signal $Y_H$ is obtained from an output 5 of the comb filter 3 and applied to an input of a detector 6 and to an input of a gate circuit 7. A combed chrominance signal Chr, obtained from another output 4 of the comb filter, is applied to a further input of said detector 6 and fed to a chrominance signal output. The detector 6 comprises a multiplier which multiplies its input signals by each other.

A low-frequency luminance signal $Y_L$ is obtained from the composite color television signal by way of a low-pass filter 2. This low-frequency luminance signal $Y_L$ is applied to an input of an adder circuit 8. The output of the gate circuit 7 is connected to a further input of the adder circuit 8 and an output of the detector 6 is connected to a control signal input of the gate circuit 7. The output signal of the adder circuit 8 is applied to a luminance signal output.

In practice a correcting delay line may be connected between the low-pass filter 2 and the adder circuit 8 so that a small time delay, caused by the gate circuit 7, can be compensated for.

The comb filter 3 comprises a high-pass filter 21 to which the composite color television signal is applied. A signal comprising the high frequency component $Y_H$ of the luminance signal and the chrominance signal Chr is obtained from an output of this filter. This signal is applied to an input of a delay line 22, an input of a subtracting circuit 23 and an input of an adder circuit 24. An output of the delay line 22 is connected to a further input of the subtracting circuit 23 and to a further input of the adder circuit 24. The delay line 22 is of a type which has a delay time of one line period (1H). As in this case in which the composite color television signal is of the N.T.S.C. type, the chrominance signal Chr is obtained at an output of the subtracting circuit 23 and the high-frequency luminance signal component $Y_H$ at an output of the adder circuit 24.

The operation will now be explained with reference to FIG. 2. In this Figure the horizontal axis is the time axis and the vertical axis a signal component level.

FIG. 2a shows the output signal of the low-pass filter 2 which only comprises the low-frequency luninance signal component $Y_L$. For a better understanding it should be noted that the component $Y_L$ is located between the chrominance component Chr and the high frequency luminance signal component $Y_H$ in FIG. 2b.

FIG. 2b shows the bandpassed high-frequency components of the composite color television signal at the output of the high-pass filter 21. This FIG. 2b shows a typical example of the lack of correlation between one line and the next. The burst signal is denoted by bu. The phase thereof changes every line (bu indicates the burst signal anti-phase) due to the choice of the frequency of the chrominance subcarrier in an N.T.S.C. signal. The chrominance component Chr and the high-frequency luminance component $Y_H$ are assumed to occur only in a certain period.

Figure 2:
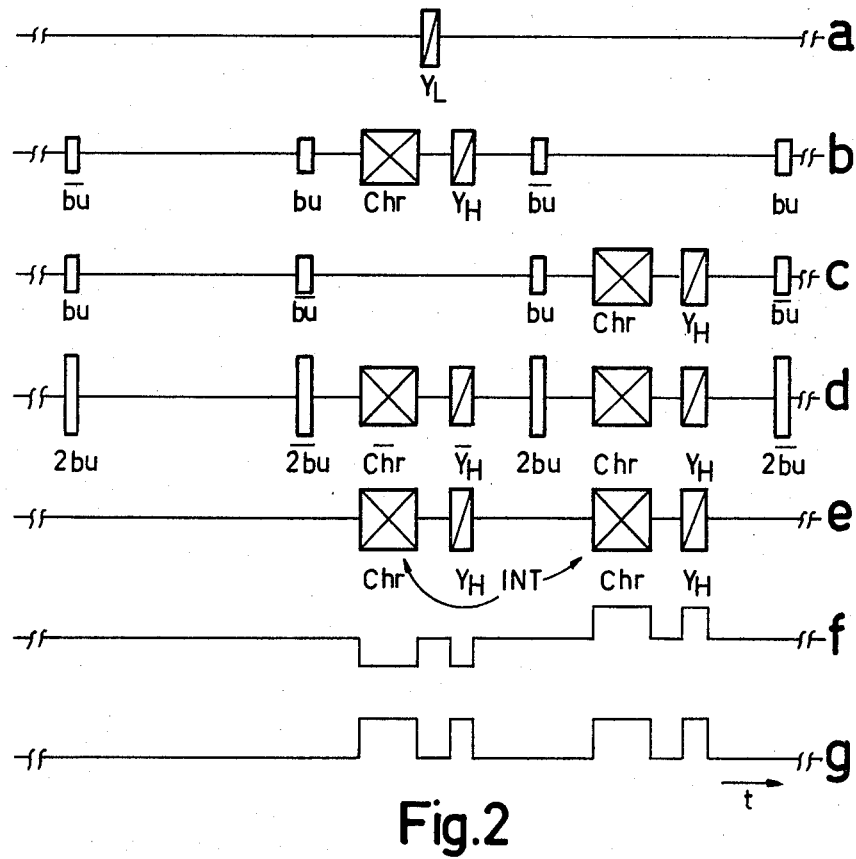
FIG. 2 shows the operation of the comb filter circuit shown in FIG. 1 by means of a wave-form diagram.

FIG. 2c shows the signal delayed over one line (1H) by the delay line 22. Adding and subtracting the signals of said FIGS. 2b and 2c by means of the adder circuit 24 and the subtracting circuit 23 furnishes the respective output signals of the comb filter circuit 3 as shown in FIGS. 2e and 2d. The output signal obtained from the output terminal 4 of the comb filter 3 as shown in FIG. 2d (namely c minus b in FIG. 2) is used as the chrominance signal of the chrominance signal output and also as one of the input signals of the detector 6, this output signal consisting of the in-phase high-frequency luminance signal $Y_H$ and the signal $Y_H$ of the opposite phase, and the in-phase chrominance signal Chr and the signal Chr of the opposite phase.

From a practical point of view the imperfect suppression function of the subtraction circuit of the comb filter 3 for the chrominance signal can be tolerated although this chrominance signal comprises unwanted high-frequency luminance signals which cause a so-called "cross-color" interference.

The output signal obtained, as shown in FIG. 2e, from the output 5 of the comb filter 3 (namely b plus c in FIG. 2) does not only contain the high-frequency signal component $Y_H$ but also an unwanted chrominance signal component INT which could not be cancelled in the adder circuit 24 of the comb filter 3. This unwanted chrominance signal component INT would produce a "dot" interference in a picture obtained by means of this output signal. This output signal, shown in FIG. 2e, is multiplied in the detector 6 by the output signal of FIG. 2d, so that an output signal as shown in FIG. 2f can be obtained from the multiplier. This signal is processed further, which results in a detector output signal as shown in FIG. 2g. By acting so the detector 6 supplies an output signal only in those periods in which there is no correlation between the composite signals of a line and a subsequent line, no output signal is produced in the correlated periods. The gate circuit 7 is operated by the output signal of the detector 6. The gate circuit 7 becomes non-conductive when the high-frequency luminance signal $Y_H$ contains a chrominance signal component INT which was not suppressed so that only the low-frequency luminance signal $Y_L$ as shown in FIG. 2a, is supplied at the signal terminal Y. Therefore, no unwanted chrominance signal is present in the luminance signal Y.

So the luminance signal Y at the output of the circuit comprises the high-frequency luminance signal component $Y_H$ as well as the low-frequency luminance signal component $Y_L$ if there is a correlation in consecutive lines, but only the low-frequency luminance signal component $Y_L$ if there is no correlation in the consecutive lines. In practice this causes no serious faults in the picture because the gate circuit 7 only becomes non-conductive in the non-correlated periods of the composite color television signal, which are usually of a very brief duration.

Another embodiment according to the invention will now be further explained with reference to FIG. 3. Components in FIG. 3 which correspond to components in FIG. 1 have been given the same reference numerals. The output terminal 5 of the comb filter 3 is connected to the input of the detector 6 and the output terminal 5 is connected directly to an input of the adder circuit 8. The output of this adder circuit 8 is connected to the luminance signal output Y and to an input of a switchable notch filter 9 comprising a series circuit 25, 26 tuned to the chrominance carrier frequency. The output of the detector 6 is connected to a control signal input of the filter 9. The filter 9 is connected to ground by means of a switch 27 if there is no correlation in the color information between one line period and the next. The output signal of the detector 6 is applied to the control signal input of the filter 9 and operates the switch 27. When it receives this signal, filter 9 short-circuits the unsuppressed chrominance signal to ground, which results in that the luminance signal Y at the luminance signal output does not contain the unsuppressed chrominance signal.

FIG. 4 shows an example of a practical circuit for a possible elaboration of the detector 6 comprising a multiplier and a processing circuit. In the circuit of FIG. 4 a type TAA 630S integrated circuit is used as the multiplier 10. The output signal of the multiplier 10 is applied to an input of a low-pass filter 11 for suppressing unwanted noise. The output signal of the low-pass filter 11 is applied on the one hand to an inverter 12 and on the other hand to an in-phase amplifier 13. The outputs of the inverter 12 and the in-phase amplifier 13 are connected to an input of a pulse-shaper 14 from which the control signal for the gate circuit 7 of the filter 9 can be obtained.

The inverter 12 supplies a negative-going output signal in the positive periods of the input signal only. The input signal obtained from the multiplier 10 and having positive and negative portions, as shown in FIG. 2f, is first applied to an emitter follower 39, 40, 41, 42, 43, 44, where the negative portion is suppressed by a suitable bias setting, and is thereafter applied to the base of a transistor 47 of an amplifier 45, 46, 47, 48, whereby the inverted negative-going output signal, which corresponds to the positive portion of the input signal, can be obtained from the collector of the transistor 47. In contradistinction therewith the in-phase amplifier 13 only operates in the negative period of its input signal. The input signal is applied to the base of a transistor 52 of an inverter 49, 50, 51, 52, 53, which blocks the positive portion, and is then applied to the base of a transistor 56 of an inverter 54, 55, 56, so that the negative-going output signal can be obtained in-phase and corresponding to the negative portion of the input signal from the collector of the transistor 56.

The two output signals, which are obtained from the inverter 12 and the in-phase amplifier 13, are added by means of the common load resistor 48 and applied to the pulse-shaper 14. This pulse-shaper has an overdriven transistor amplifier 57, 58 to form a suitable positive-going control signal for the gate circuit 7, or the filter 9, as the output signal of the detector as shown in FIG. 2g.

Figure 5:
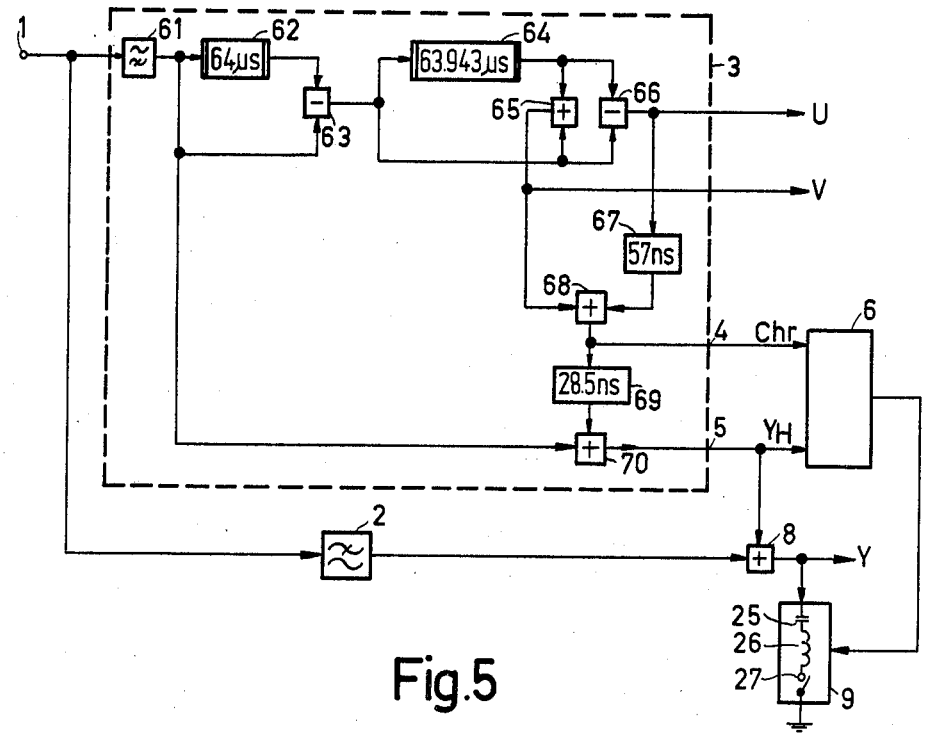
FIG. 5 shows schematically an embodiment of a comb filter circuit according to the invention having a comb filter for a PAL color television signal.

In FIG. 5 a combined high-frequency luminance signal obtained from the output 5 of the comb filter 3 is applied to an input of the detector 6 and to an input of the switched notch filter 9 which is tuned to the chrominance carrier frequency. The combed chrominance signal obtained from the other output 4 of the comb filter 3 is applied to an other input of the detector 6. The output of the detector 6 is connected to a control signal input of the filter 9.

The functions of the detector and the filter are exactly the same as in the case described for FIG. 3.

The comb filter 3 comprises a high-pass filter 61 to which the composite color television signal is applied.

A signal comprising the high-frequency component $Y_H$ of the luminance signal and the chrominance signal component Chr is obtained from an output of this filter. This signal is applied to an input of a delay line 62, to an input of a subtracting circuit 63 and to an input of an adder circuit 70.

An output of the delay line 62 is connected to a further input of the subtracting circuit 63.

The delay line 62 is of the type which has a time delay of exactly one line period (1H) (64 μs).

The chrominance signal Chr is obtained from the output of the subtracting circuit 63 and is applied to an input of a further delay line 64 having a time delay of 63,943 μs, to an input of an adder circuit 65 and to an input of a subtracting circuit 66. The V component separated from the chrominance signal is obtained from the output of the adder circuit 65 and is passed to an input of an adder circuit 68. The U-component separated from the chrominance signal is obtained at the output of the subtracting circuit 66 and is applied to a delay line 67 with a time delay of approximately 57 nS to shift the phase of the signal over 90°. The output of the delay line 67 is connected to the further input of the adder circuit 68. A recombined chrominance signal Chr is obtained from the adder circuit 68 and is applied to an input of the detector 6 and to an input of a delay line 69, having a time delay of approximately 28.5 nS, to shift the phase of the signal over 45°.

The phase-shifted chrominance signal obtained from the output of the delay line 69 is applied to a further input of the adder circuit 70.

The high-frequency component $Y_H$ of the luminance signal is then obtained from the output of the adder circuit 70.

Figure 6:
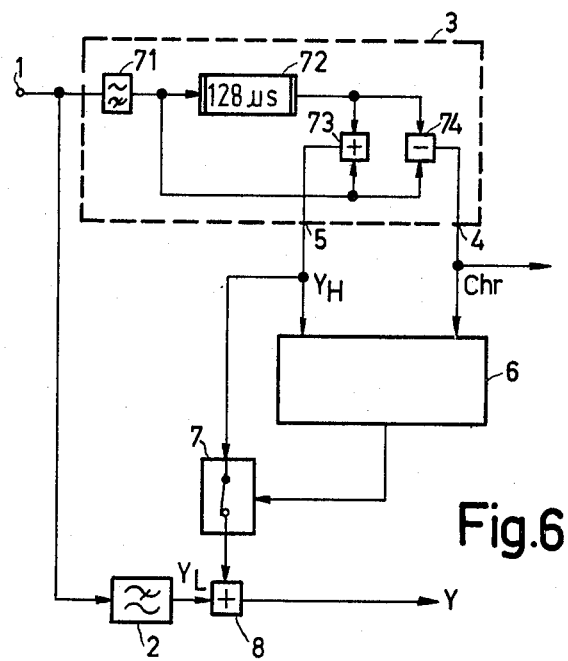
FIG. 6 is a diagram of an other embodiment of a comb filter circuit according to the invention having an other type of comb filter for a PAL-signal.

In FIG. 6 the combed high-frequency luminance signal at the output 5 of the comb filter 3 is applied to an input of the detector 6 and also to an input of the gate circuit 7, the combed chrominance signal obtained from the output 4 of the comb filter 3 is applied to the other input of said detector 6. The output of the detector 6 is connected to a control signal input of the gate circuit 7. The functions of the detector 6 and the gate circuit 7 are the same as in the case of FIG. 1.

The comb filter 3 comprises a high-pass filter 71 to which the composite color television signal is applied.

A signal comprising the high frequency component $Y_H$ of the luminance signal and the chrominance signal component Chr is obtained from an output of this filter.

This signal is applied to an input of a delay line 72, an input of an adder circuit 73 and an input of a subtracting circuit 74. An output of the delay line 72 is connected to a further input of the adder circuit 73 and to a further input of the subtracting circuit 74. The delay line 72 is of the type having a delay time (128 μs) which exactly corresponds to two line periods (2H). As in this case the composite color television signal is of the P.A.L.-type, the high-frequency component $Y_H$ of the luminance signal is obtained from an output of the adder circuit 73 and the chrominance signal Chr from an output of the subtracting circuit 74.

It will be obvious that, if the gate circuit 7 or the switch 27 of the filter 9 can respond properly to signals of both polarities, the detector 6 may consist, in circuits according to the invention, of multiplier 10 only.

What is claimed is:

1. A comb filter circuit comprising an input for receiving a composite color television signal, a comb filter coupled to said input and having a first and a second output for providing respectively a combed high-frequency luminance signal component from a composite color television signal and a combed chrominance signal component, a low-pass filter also coupled to said input for providing a low-frequency luminance signal component, an adding circuit having a first input coupled to the first output of the comb filter and a second input coupled to the low-pass filter, a detector coupled to the first and second outputs of said comb filter for detecting an unsuppressed chrominance signal component in the high-frequency luminance signal component, and an attenuation circuit having a control input coupled to said detector for attenuating at least a portion of the high-frequency luminance signal component at the first input of said adding circuit when an unsuppressed chrominance signal occurs in said high-frequency luminance signal component, wherein the detector comprises a multiplier having a first input coupled to the first output of the comb filter, a second input coupled to the second output of the comb filter, and an output coupled to the control input of the attenuation circuit.

2. A comb filter circuit as claimed in claim 1, wherein said detector further comprises a low-pass filter coupled to the output of the multiplier, a phase-inverting and an in-phase amplifier both coupled to said low-pass filter, a pulse shaper coupled to said phase-inverting and in-phase amplifiers, the pulse shaper being coupled to the output of the detector.

3. A comb filter circuit as claimed in claim 1 or 2, wherein the attenuation circuit comprises the gate circuit coupled between the first output of the comb filter and the first input of the adding circuit, the gate circuit being controlled by the output signal of the detector so that the high frequency component of the luminance signal, which comprises an unsuppressed chrominance signal, is prevented, by a gate circuit, from being added to the low-frequency component of the luminance signal if there is no correlation between one line and the next line of the composite color television signal.

4. A comb filter circuit as claimed in claim 1 or 2, wherein the attenuation circuit comprises a switchable notch filter having a series circuit tuned to the frequency of the chrominance subcarrier, the switchable notch filter being operated by the output signal of the detector, so that the high-frequency component with an unsuppressed chrominance signal in the output signal of the adding circuit is suppressed by the notch filter if there is no correlation between one line and the next line of the composite color television signal.

* * * * *